United States Patent [19]

Kazmaier et al.

[11] Patent Number: 5,935,755
[45] Date of Patent: *Aug. 10, 1999

[54] METHOD FOR DOCUMENT MARKING AND RECOGNITION

[75] Inventors: Peter M. Kazmaier, Mississauga; Erwin Buncel; Herbert F. Shurvell, both of Kingston, all of Canada

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/517,390

[22] Filed: Aug. 21, 1995

[51] Int. Cl.$^6$ ............................ G03G 13/08; G03G 13/10
[52] U.S. Cl. ........................ 430/120; 430/110; 430/115; 430/117; 430/126; 427/7; 427/8; 427/256; 427/265; 427/288; 427/469; 427/421; 380/51; 380/54; 380/55; 283/85; 283/901; 283/902; 106/31.14; 106/31.43; 106/31.47; 106/31.75; 106/31.77
[58] Field of Search ................................ 427/7, 8, 421, 427/288, 256, 265, 469; 106/31.14, 31.64, 31.27, 31.43, 31.47, 31.6, 31.75, 31.77, 31.45, 31.46, 31.48, 31.49, 31.76, 31.78, 31.79; 430/10, 944, 48, 110, 115, 117, 120, 126; 399/366, 84; 283/902, 91, 901, 85, 88; 380/51, 54, 55

[56] References Cited

U.S. PATENT DOCUMENTS

| | | | |
|---|---|---|---|
| 3,824,099 | 7/1974 | Champ et al. | 430/58 |
| 4,990,649 | 2/1991 | Schrott et al. | 560/25 |
| 5,160,171 | 11/1992 | Gregory et al. | 427/7 |
| 5,164,232 | 11/1992 | Henseleit et al. | 427/288 |
| 5,225,900 | 7/1993 | Wright | 358/75 |
| 5,282,894 | 2/1994 | Albert et al. | 106/31.43 |
| 5,301,044 | 4/1994 | Wright | 358/500 |
| 5,324,567 | 6/1994 | Bratchley et al. | 106/31.14 |
| 5,395,432 | 3/1995 | Nelson et al. | 106/31.14 |
| 5,455,673 | 10/1995 | Alsmeyer et al. | 356/301 |
| 5,470,683 | 11/1995 | Inaishi | 430/106 |

*Primary Examiner*—Janis L. Dote
*Attorney, Agent, or Firm*—Judith L. Byorick

[57] ABSTRACT

Disclosed is a process which comprises (a) applying to a recording sheet a marking material comprising a Raman-detectable component which, when irradiated with monochromatic radiation, exhibits a detectable Raman spectrum, thereby forming a mark on the recording sheet; (b) irradiating the mark on the recording sheet with monochromatic radiation; and (c) measuring the Raman spectrum of radiation scattered from the mark when the mark is irradiated with monochromatic radiation.

21 Claims, No Drawings

METHOD FOR DOCUMENT MARKING AND RECOGNITION

BACKGROUND OF THE INVENTION

The present invention is directed to processes for marking and identifying documents. More specifically, the present invention is directed to processes for identifying documents with Raman spectroscopy. One embodiment of the present invention is directed to a process which comprises (a) applying to a recording sheet a marking material comprising a Raman-detectable component which, when irradiated with monochromatic radiation, exhibits a detectable Raman spectrum, thereby forming a mark on the recording sheet; (b) irradiating the mark on the recording sheet with monochromatic radiation; and (c) measuring the Raman spectrum of radiation scattered from the mark when the mark is irradiated with monochromatic radiation.

In the increasingly complex world of document handling, there is a need for improved document recognition systems. Such systems are useful in applications such as security for documents such as legal papers, bank notes, or the like, where authentication is required. Such systems are also useful in applications wherein hidden markers are useful for machine communication. Preferably, such a system is not readily detected by the casual user, has few interferences from paper additives, and is highly sensitive.

The process of the present invention in one embodiment entails placing on recording sheets markings that are not readily detectable by the casual user but are detectable when irradiated with light and scanned via Raman spectroscopy. These embodiments are particularly useful in processes wherein it is desired to place markings on documents that have unique characteristics and are not readily duplicated; examples of such situations include providing security markings to control the number of copies made of a document, providing hidden markings that can be detected by an imaging device and that provide instructions to the imaging device (such as instructions not to copy certain portions of the document or to alter the color of certain portions of the document), identifying the machine with which the original document was made, or the like. In addition, the ability to print images which are machine-readable but invisible to the eye under normal viewing conditions can be employed in the area of security printing as well as a means of encoding documents. Substantially hidden marks can be printed on a document for purposes such as controlling the integrity of a printing job set or monitoring downstream functional operations. Examples of apparatuses and processes in which inks containing dyes that are detectable in a wavelength range outside the visible range are employed are disclosed in U.S. Pat. No. 5,225,900, the disclosure of which is totally incorporated herein by reference.

In another embodiment, the process of the present invention entails placing on recording sheets markings with a marking material that contains both a visible colorant, such as a pigment or a dye, and a material which is detectable when irradiated with light and scanned via Raman spectroscopy. These embodiments can, for example, be used to identify the source of a particular ink or to provide instructions to an imaging device capable of detecting the invisible particles.

U.S. Pat. No. 5,225,900 (Wright) and U.S. Pat. No. 5,301,044 (Wright), the disclosures of each of which are totally incorporated herein by reference, disclose apparatuses and processes for controlling a reproduction system by scanning an image to detect at least one taggant in at least one marking material forming the image and issuing instructions to the reproduction system; the instructions cause the reproduction system to take an action selected from the group consisting of (a) prohibiting reproduction of those portions of the image formed by a marking material containing at least one predetermined detected taggant and reproducing all other portions of the image; (b) prohibiting reproduction of any part of the image upon detection of at least one predetermined taggant; (c) reproducing only those portions of the image formed by a marking material containing at least one predetermined taggant; (d) reproducing portions of the image formed by a marking material containing at least one predetermined taggant in a different manner from that in which the system reproduces portions of the image formed by a marking material not containing at least one predetermined taggant; and (e) identifying a source of the image on the basis of detection of at least one predetermined taggant.

U.S. Pat. No. 5,145,518 (Winnik et al.), the disclosure of which is totally incorporated herein by reference, discloses an ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles, said dye molecules being detectable when exposed to radiation outside the visible wavelength range. Optionally, silica is precipitated within the micelles. In a specific embodiment, the dye molecules are substantially colorless. In another specific embodiment, the ink also contains a colorant detectable in the visible wavelength range.

U.S. Pat. No. 5,146,087 (VanDusen), the disclosure of which is totally incorporated herein by reference, discloses a process which comprises providing an imaging apparatus equipped with a path for moving receiver sheets through the apparatus and having infrared sensors situated along said path, incorporating into the imaging apparatus a substantially transparent receiver sheet having coated on at least a portion thereof an infrared absorbing material contained in a polymeric binder, passing the substantially transparent receiver sheet along the path, wherein the infrared sensors detect the presence of the infrared absorbing material on the substantially transparent receiver sheet, and generating an image on the substantially transparent receiver sheet.

U.S. Pat. No. 5,286,286 (Winnik et al.), the disclosure of which is totally incorporated herein by reference, discloses an ink composition consisting essentially of water, diethylene glycol-monobutyl ether (butyl carbitol), glycerol, an optional cyclohexyl pyrrolidinone component, a dye selected from the group consisting of dyes containing dansyl chromophores and dyes containing porphyrin chromophores, an optional biocide, and an optional polyalkylene oxide/bisphenol-A additive.

Although known compositions and processes are suitable for their intended purposes, a need remains for methods of generating images that are not easily visible under ordinary viewing conditions but which can be detected under special conditions. In addition, a need remains for marking materials capable of generating images that are visible and which can be identified and distinguished from other visible marking materials. Further, there is a need for processes for placing encoded information in a document in a manner not distracting or easily visible to the casual user. There is also a need for highly reliable processes for authenticating documents. Additionally, there is a need for processes for authenticating documents which have few interferences from paper additives. In addition, there is a need for processes for authenticating documents which are highly sensitive. Further, there is a need for methods for marking documents that are very difficult to duplicate or forge. There is also a need for nonoptical means of authentification of documents for added security; the use of lasers as a scanning device coupled with Raman detection provides for very small spot resolution and allows the encoded information to be located in a very small spot.

SUMMARY OF THE INVENTION

It is an object of the present invention to provide a marking material with the above noted advantages.

It is another object of the present invention to provide methods of generating images that are not easily visible under ordinary viewing conditions but which can be detected under special conditions.

It is yet another object of the present invention to provide marking materials capable of generating images that are visible and which can be identified and distinguished from other visible marking materials.

It is still another object of the present invention to provide processes for placing encoded information in a document in a manner not distracting or easily visible to the casual user.

Another object of the present invention is to provide highly reliable processes for authenticating documents.

Yet another object of the present invention is to provide processes for authenticating documents which have few interferences from paper additives.

Still another object of the present invention is to provide processes for authenticating documents which are highly sensitive.

It is another object of the present invention to provide methods for marking documents that are very difficult to duplicate or forge.

It is yet another object of the present invention to provide nonoptical means of authentification of documents for added security.

It is still another object of the present invention to provide the placement of encoded information on a document in a very small spot.

These and other objects of the present invention (or specific embodiments thereof) can be achieved by providing a process which comprises (a) applying to a recording sheet a marking material comprising a Raman-detectable component which, when irradiated with monochromatic radiation, exhibits a detectable Raman spectrum, thereby forming a mark on the recording sheet; (b) irradiating the mark on the recording sheet with monochromatic radiation; and (c) measuring the Raman spectrum of radiation scattered from the mark when the mark is irradiated with monochromatic radiation.

DETAILED DESCRIPTION OF THE INVENTION

The processes of the present invention entail applying to a recording sheet a marking material comprising a Raman-detectable component which, when irradiated with monochromatic radiation, exhibits a detectable Raman spectrum. Thereafter, the mark is irradiated with monochromatic radiation and the Raman spectrum of radiation scattered from the mark when the mark is irradiated with monochromatic radiation is measured.

Any of a wide variety of suitable marking methods and materials can be employed. To the marking material, whether solid or liquid, is added a Raman-detectable component, and the marking material is then used in any suitable imaging method. In some instances, the marking material may consist of 100 percent of the Raman-detectable component. The Raman-detectable component is present in the marking material in any amount effective for enabling detection and/or identification of a Raman spectrum of the Raman-detectable component when the marking material on the recording sheet is irradiated with monochromatic radiation. Typically, the Raman-detectable component is present in the marking material in amounts of from about 5 to about 100 percent by weight, and preferably from about 80 to about 100 percent by weight, although the amount can be outside these ranges.

Preferably, the Raman-detectable component is one that emits a signal in the Raman spectrum when irradiated with light in the near-infrared region, more particularly in the wavelength range of from about 680 to about 1400 nanometers. Raman-detectable components which emit a Raman signal at wavelengths lower than about 680 nanometers are also suitable, but may be less preferred because papers, toner pigments, ink colorants, and other similar materials which may also be present on or in the recording sheet may also absorb energy at these lower wavelengths, which might mask the Raman signal of the Raman-detectable component. Raman-detectable components which emit a Raman signal at wavelengths higher than about 1400 nanometers are also suitable, but may be difficult to obtain.

Particularly preferred Raman-detectable components are those that exhibit a strong, distinct Raman spectrum at a wavelength where most paper and dye or pigment colorants are transparent. For example, when exposed to a neodymium YAG laser at 1064 nanometers, many squaraine compounds emit a strong, unique signal in the Raman spectrum at about 1600 cm$^{-1}$ off the excitation YAG line. Squaraine compounds are of the general formula

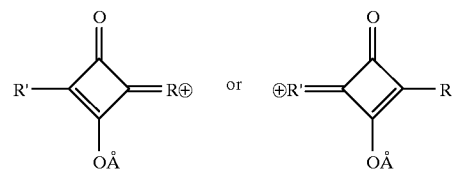

wherein R and R' each, independently of the other, can be

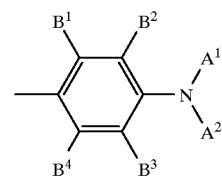

wherein $A^1$ and $A^2$ can each, independently of the other, be hydrogen atoms, alkyl groups, preferably with from 1 to about 18 carbon atoms, substituted alkyl groups, preferably with from 1 to about 18 carbon atoms, aryl groups, preferably with from about 6 to about 20 carbon atoms, substituted aryl groups, preferably with from about 6 to about 20 carbon atoms, arylalkyl groups, preferably with from about 6 to about 38 carbon atoms, substituted arylalkyl groups, preferably with from about 6 to about 38 carbon atoms, heterocyclic rings, preferably of from about 5 to about 7 members wherein the hetero atom is nitrogen, oxygen, sulfur, phosphorus, boron, or the like, such as pyrrolidine, pyridine, piperidine, piperazine, quinoline, isoquinoline, quinuclidine, pyrazole, triazole, tetrazole, triazine, imidazole, pyrimidine, pyradizine, pyrazine, oxazole, isoxazole, morpholine, and the like, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, nitro groups, sulfone groups, acyl groups, acid anhydride groups, azide groups, and the like, and wherein $A^1$ and $A^2$ can be joined together to form a ring containing the nitrogen atom to which $A^1$ and $A^2$ are attached, such as a pyrrole ring, an indole ring, an indolizine ring, a pyrrolidine ring, a pyridine ring, a piperidine ring, a piperazine ring, a quinoline ring, an isoquinoline ring, a quinuclidine ring, an indazole ring, a pyrazole ring, a triazole ring, a tetrazole ring, a triazine ring, a urazole ring, an imidazole ring, a pyrimidine ring, a pyradizine ring, a pyrazine ring, an oxazole ring, an isoxazole ring, a morpholine ring, or the like, and wherein $B^1$, $B^2$, $B^3$, and $B^4$ can each, independently of the other, be hydrogen atoms, alkyl groups, preferably with from 1 to about 18 carbon atoms, substituted alkyl groups, preferably with from 1 to about 18 carbon atoms, aryl groups, preferably with from about 6 to about 20 carbon atoms, substituted aryl groups, preferably with from about 6 to about 20 carbon atoms, arylalkyl groups, preferably with from about 6 to about 38 carbon atoms, substituted arylalkyl groups, preferably with from about 6 to about 38 carbon atoms, heterocyclic rings, preferably of from about 5 to about 7 members wherein the hetero atom is nitrogen, oxygen, sulfur, phosphorus, boron, or the like, such as pyrrolidine, pyridine, piperidine, piperazine, quinoline, isoquinoline, quinuclidine, pyrazole, triazole, tetrazole, triazine, imidazole, pyrimidine, pyradizine, pyrazine, oxazole, isoxazole, morpholine, and the like, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, nitro groups, sulfone groups, acyl groups, acid anhydride groups, azide groups, and the like, wherein the B groups can be joined together to form one or more rings,

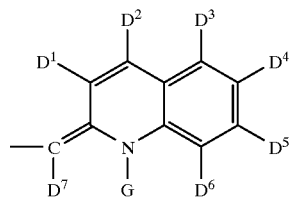

wherein G is selected from the group consisting of hydrogen atoms, alkyl groups, preferably with from 1 to about 18 carbon atoms, substituted alkyl groups, preferably with from 1 to about 18 carbon atoms, aryl groups, preferably with from about 6 to about 20 carbon atoms, substituted aryl groups, preferably with from about 6 to about 20 carbon atoms, arylalkyl groups, preferably with from about 6 to about 38 carbon atoms, substituted arylalkyl groups, preferably with from about 6 to about 38 carbon atoms, heterocyclic rings, preferably of from about 5 to about 7 members wherein the hetero atom is nitrogen, oxygen, sulfur, phosphorus, boron, or the like, such as pyrrolidine, pyridine, piperidine, piperazine, quinoline, isoquinoline, quinuclidine, pyrazole, triazole, tetrazole, triazine, imidazole, pyrimidine, pyradizine, pyrazine, oxazole, isoxazole, morpholine, and the like, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, nitro groups, sulfone groups, acyl groups, acid anhydride groups, azide groups, and the like, and $D^1$, $D^2$, $D^3$, $D^4$, $D^5$, $D^6$, and $D^7$ each, independently of the others, can be hydrogen atoms, alkyl groups, preferably with from 1 to about 18 carbon atoms, substituted alkyl groups, preferably with from 1 to about 18 carbon atoms, aryl groups, preferably with from about 6 to about 20 carbon atoms, substituted aryl groups, preferably with from about 6 to about 20 carbon atoms, arylalkyl groups, preferably with from about 6 to about 38 carbon atoms, substituted arylalkyl groups, preferably with from about 6 to about 38 carbon atoms, heterocyclic rings, preferably of from about 5 to about 7 members wherein the hetero atom is nitrogen, oxygen, sulfur, phosphorus, boron, or the like, such as pyrrolidine, pyridine, piperidine, piperazine, quinoline, isoquinoline, quinuclidine, pyrazole, triazole, tetrazole, triazine, imidazole, pyrimidine, pyradizine, pyrazine, oxazole, isoxazole, morpholine, and the like, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, nitro groups, sulfone groups, acyl groups, acid anhydride groups, azide groups, and the like, and wherein two or more of the G and D groups can be joined together to form one or more rings,

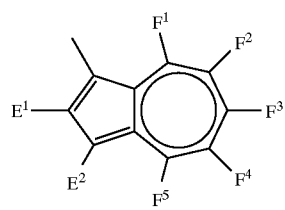

wherein $E^1$ and $E^2$ each, independently of the other, can be hydrogen atoms, alkyl groups, preferably with from 1 to about 18 carbon atoms, substituted alkyl groups, preferably with from 1 to about 18 carbon atoms, aryl groups, preferably with from about 6 to about 20 carbon atoms, substituted aryl groups, preferably with from about 6 to about 20 carbon atoms, arylalkyl groups, preferably with from about 6 to about 38 carbon atoms, substituted arylalkyl groups, preferably with from about 6 to about 38 carbon atoms, heterocyclic rings, preferably of from about 5 to about 7 members wherein the hetero atom is nitrogen, oxygen, sulfur, phosphorus, boron, or the like, such as pyrrolidine, pyridine, piperidine, piperazine, quinoline, isoquinoline, quinuclidine, pyrazole, triazole, tetrazole, triazine, imidazole, pyrimidine, pyradizine, pyrazine, oxazole, isoxazole, morpholine, and the like, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, nitro groups, sulfone groups, acyl groups, acid anhydride groups, azide groups, and the like, and $F^1$, $F^2$, $F^3$, $F^4$, and $F^5$ each, independently of the others, can be hydrogen atoms, alkyl groups, preferably with from 1 to about 18 carbon atoms, substituted alkyl groups, preferably with from 1 to about 18 carbon atoms, aryl groups, preferably with from about 6 to about 20 carbon atoms, substituted aryl groups, preferably with from about 6 to about 20 carbon atoms, arylalkyl groups, preferably with from about 6 to about 38 carbon atoms, substituted arylalkyl groups, preferably with from about 6 to about 38 carbon atoms, heterocyclic rings, preferably of from about 5 to about 7 members wherein the hetero atom is nitrogen, oxygen, sulfur, phosphorus, boron, or the like, such as pyrrolidine, pyridine, piperidine, piperazine, quinoline, isoquinoline, quinuclidine, pyrazole, triazole, tetrazole, triazine, imidazole, pyrimidine, pyradizine, pyrazine, oxazole, isoxazole, morpholine, and the like, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, sulfate groups, sulfonate groups, phosphine groups, phosphonium groups, phosphate groups, cyano groups, nitrile groups, mercapto groups, nitroso groups, nitro groups, sulfone groups, acyl groups, acid anhydride groups, azide groups, and the like, wherein two or more of the E and F groups can be joined together to form one or more rings, and the like.

Squaraine compounds of these general formulae can be prepared as disclosed in, for example, U.S. Pat. Nos. 3,824,099, 4,150,987, 4,471,041, 4,486,520, 4,507,480, 4,524,218, 4,552,822, 4,559,286, 4,607,124, 4,621,038, 4,624,904, and 4,746,756, the disclosures of each of which are totally incorporated herein by reference. One example of such a preferred material is of the formula

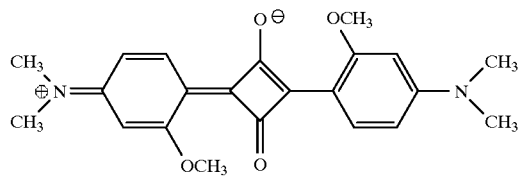

and can be prepared as described in Example X. Another example of such a preferred material is of the formula

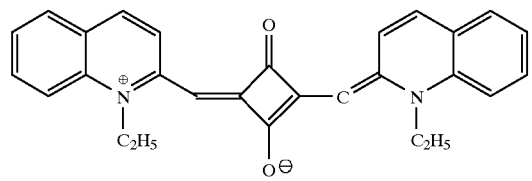

and is prepared as disclosed in H. E. Sprenger and W. Ziegenbein, *Angewandte Chemie International Edition*, vol. 6, pp 553–554 (1967), the disclosure of which is totally incorporated herein by reference.

Also preferred as Raman-detectable components are phthalocyanines of the general formula

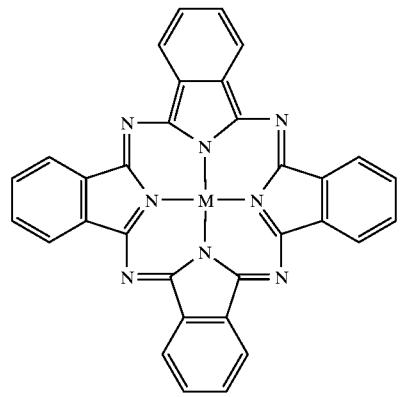

wherein M represents a metal atom, such as copper or the like, a functionalized metal, that is, any metal bearing additional substituents or ligands beyond the phthalocyanine moiety, such as oxovanadium, hydroxygallium, or the like, wherein bonding can be either predominantly ionic or covalent in nature, or two hydrogen atoms (metal-free phthalocyanine). The synthesis of phthalocyanines is well known, and is described in, for example, R. P. Linstead, *J. Chem. Soc.*, 1017–1022 (1934), U.S. Pat. No. 4,032,339, U.S. Pat. No. 4,471,039, U.S. Pat. No. 4,557,868, and U.S. Pat. No. 5,102,758, the disclosures of each of which are totally incorporated herein by reference.

Also preferred as Raman-detectable components are metal dithiolates, of the general formula

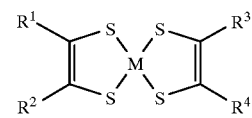

wherein M represents a transition metal atom, with nickel being preferred, and wherein $R^1$, $R^2$, $R^3$, and $R^4$ each, independently of the others, can be an alkyl group, preferably with from about 1 to about 18 carbon atoms, a substituted alkyl group, preferably with from about 1 to about 18 carbon atoms, an aromatic group, preferably with from about 6 to about 20 carbon atoms, a substituted aromatic group, preferably with from about 6 to about 20 carbon atoms, an arylalkyl group, preferably with from about 6 to about 38 carbon atoms, a substituted arylalkyl group, preferably with from about 6 to about 38 carbon atoms, or a heterocyclic ring, preferably with from about 5 to about 7 members, with the hetero atom being nitrogen, oxygen, sulfur, phosphorus, boron, or the like, with examples of suitable substituents including but not limited to mercapto groups, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, sulfate groups, sulfonate groups, phosphine groups, phosphonium groups, phosphate groups, cyano groups, nitrile groups, mercapto groups, nitroso groups, nitro groups, sulfone groups, acyl groups, acid anhydride groups, azide groups, and the like, with examples of preferred groups including (but not limited to) phenyl, indole, furan, pyrrole, and the like, and wherein two or more of the R groups can be joined to form a ring. Metal dithiolates are known, and can be prepared as disclosed in, for example, W. Freyer, *J. Prakt. Chem.*, vol. 308, pp 253–260 (1986) and in H. Zelek et al., *Inorg. Chem.*, vol. 21, pp 46–56 (1982), the disclosures of each of which are totally incorporated herein by reference.

The Raman-detectable component can be placed on the recording sheet by any desired or suitable method, and may be either visible to the naked eye or substantially hidden, at least upon cursory inspection. For example, the Raman-detectable component can be included within a conventional marking material, either in the presence of a colorant or in the absence of another colorant. For example, a Raman-detectable component can be included within a powder toner composition suitable for developing electrostatic latent images, and the toner containing the Raman-detectable component can then be used to develop an electrostatic latent image. The formation and development of images on the surface of photoconductive materials by electrostatic means is well known. The basic electrophotographic imaging process, as taught by C. F. Carlson in U.S. Pat. No. 2,297,691, entails placing a uniform electrostatic charge on a photoconductive insulating layer known as a photoconductor or photoreceptor, exposing the photoreceptor to a light and shadow image to dissipate the charge on the areas of the photoreceptor exposed to the light, and developing the resulting electrostatic latent image by depositing on the image a finely divided electroscopic material known as toner. Toner typically comprises a resin and a colorant. The toner will normally be attracted to those areas of the photoreceptor which retain a charge, thereby forming a toner image corresponding to the electrostatic latent image. This developed image may then be transferred to a recording sheet such as paper. The transferred image may subsequently be permanently affixed to the recording sheet by heat, pressure, a combination of heat and pressure, or other suitable fixing means such as solvent or overcoating treatment.

Another known process for forming electrostatic images is ionography. In ionographic imaging processes, a latent image is formed on a dielectric image receptor or electroreceptor by ion deposition, as described, for example, in U.S. Pat. No. 3,564,556, U.S. Pat. No. 3,611,419, U.S. Pat. No. 4,240,084, U.S. Pat. No. 4,569,584, U.S. Pat. No. 2,919,171, U.S. Pat. No. 4,524,371, U.S. Pat. No. 4,619,515, U.S. Pat. No. 4,463,363, U.S. Pat. No. 4,254,424, U.S. Pat. No. 4,538,163, U.S. Pat. No. 4,409,604, U.S. Pat. No. 4,408,214, U.S. Pat. No. 4,365,549, U.S. Pat. No. 4,267,556, U.S. Pat. No. 4,160,257, and U.S. Pat. No. 4,155,093, the disclosures of each of which are totally incorporated herein by reference. Generally, the process entails application of charge in an image pattern with an ionographic writing head to a dielectric receiver that retains the charged image. The image is subsequently developed with a developer capable of developing charge images.

Many methods are known for applying the electroscopic particles to the electrostatic latent image to be developed. One development method, disclosed in U.S. Pat. No. 2,618,552, the disclosure of which is totally incorporated herein by reference, is known as cascade development. Another technique for developing electrostatic images is the magnetic brush process, disclosed in U.S. Pat. No. 2,874,063. This method entails the carrying of a developer material containing toner and magnetic carrier particles by a magnet. The magnetic field of the magnet causes alignment of the magnetic carriers in a brushlike configuration, and this "magnetic brush" is brought into contact with the electrostatic image bearing surface of the photoreceptor. The toner particles are drawn from the brush to the electrostatic image by electrostatic attraction to the undischarged areas of the photoreceptor, and development of the image results. Other techniques, such as touchdown development, powder cloud development, and jumping development are known to be suitable for developing electrostatic latent images.

Typically, in a dry powder toner material for the present invention for developing electrostatic latent images, the Raman-detectable component is present in the toner in an amount of from about 5 to about 95 percent by weight, more preferably from about 20 to about 90 percent by weight, and even more preferably from about 50 to about 90 percent by weight, although the amount can be outside these ranges. The Raman-detectable component can be present in the dry powder toner as an ingredient which is melt mixed with the toner resin prior to formation of toner particles. Alternatively, a dry powder toner can contain the Raman-detectable component dry blended with particles of the toner resin (which toner resin may or may not, as desired, contain a colorant, a charge control agent, or any other optional ingredients).

Typical toner resins include polyesters, polyamides, epoxies, polyurethanes, diolefins, vinyl resins and polymeric esterification products of a dicarboxylic acid and a diol comprising a diphenol. Examples of vinyl monomers include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids, including methyl acrylate, ethyl acrylate, n-butyl acrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and the like; acrylonitrile, methacrylonitrile, acrylamide, vinyl ethers, including vinyl methyl ether, vinyl isobutyl ether, and vinyl ethyl ether; vinyl ketones such as vinyl methyl ketone, vinyl hexyl ketone, and methyl isopropenyl ketone; N-vinyl indole and N-vinyl pyrrolidene; styrene butadienes; mixtures of these monomers; and the like. The resins are present in the toner in any effective amount, typically from about 10 to 95 percent by weight, preferably from about 20 to about 90 percent by weight, and more preferably from about 50 to about 70 percent by weight, although the amount can be outside these ranges.

Optionally, if it is desired to generate images that are visible with the naked eye, the toner composition can also contain a colorant. Typically, the colorant material is a pigment, although dyes can also be employed. Examples of suitable pigments and dyes are disclosed in, for example, U.S. Pat. No. 4,788,123, U.S. Pat. No. 4,828,956, U.S. Pat.

No. 4,894,308, U.S. Pat. No. 4,948,686, U.S. Pat. No. 4,963,455, and U.S. Pat. No. 4,965,158, the disclosures of each of which are totally incorporated herein by reference. Specific examples of suitable dyes and pigments include carbon black, nigrosine dye, aniline blue, magnetites, and mixtures thereof, with carbon black being the most common colorant. The pigment should be present in an amount sufficient to render the toner composition highly colored to permit the formation of a clearly visible image on a recording member. Typically, the pigment particles are present in amounts of from about 1 percent by weight to about 20 percent by weight based on the total weight of the toner composition, although the amount can be outside this range.

When the pigment particles are magnetites, which comprise a mixture of iron oxides ($Fe_3O_4$) such as those commercially available as Mapico Black, these pigments are present in the toner composition in any effective amount, typically from about 10 percent by weight to about 70 percent by weight, and preferably from about 20 percent by weight to about 50 percent by weight, although the amount can be outside these ranges.

Colored toner pigments are also suitable for use with the present invention, including red, green, blue, brown, magenta, cyan, and yellow particles, as well as mixtures thereof, wherein the colored pigments are present in amounts that enable the desired color. Illustrative examples of suitable magenta pigments include 2,9-dimethyl-substituted quinacridone and anthraquinone dye, identified in the color index as Cl 60710, Cl Dispersed Red 15, a diazo dye identified in the color index as Cl 26050, Cl Solvent Red 19, and the like. Illustrative examples of suitable cyan pigments include copper tetra-4-(octadecyl sulfonamido) phthalocyanine, copper phthalocyanine pigment, listed in the color index as Cl 74160, Pigment Blue, and Anthradanthrene Blue, identified in the color index as Cl 69810, Special Blue X-2137, and the like. Illustrative examples of yellow pigments that may be selected include diarylide yellow 3,3-dichlorobenzidene acetoacetanilides, a monoazo pigment identified in the color index as Cl 12700, Cl Solvent Yellow 16, a nitrophenyl amine sulfonamide identified in the color index as Foron Yellow SE/GLN, Cl Dispersed Yellow 33, 2,5-dimethoxy-4-sulfonanilide phenylazo-4'-chloro-2,5-dimethoxy aceto-acetanilide, Permanent Yellow FGL, and the like. Other suitable toner colorants include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G10 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Color pigments are typically present in the toner an amount of from about 15 to about 20.5 percent by weight, although the amount can be outside this range.

The toner compositions for the present invention can also contain an optional charge control additive. Examples of suitable charge control agents are disclosed in U.S. Pat. No. 4,788,123, U.S. Pat. No. 4,828,956, U.S. Pat. No. 4,894,308, U.S. Pat. No. 4,948,686, U.S. Pat. No. 4,963,455, and U.S. Pat. No. 4,965,1 58, the disclosures of each of which are totally incorporated herein by reference. Specific examples of suitable charge control agents include alkyl pyridinium halides, such as cetyl pyridinium chloride, as disclosed in U.S. Pat. No. 4,298,672, the disclosure of which is totally incorporated herein by reference, cetyl pyridinium tetrafluoroborates, quaternary ammonium sulfate and sulfonate compounds, such as distearyl dimethyl ammonium methyl sulfate, as disclosed in U.S. Pat. No. 4,338,390, the disclosure of which is totally incorporated herein by reference, stearyl phenethyl dimethyl ammonium tosylates, as disclosed in U.S. Pat. No. 4,338,390, distearyl dimethyl ammonium methyl sulfate, as disclosed in U.S. Pat. No. 4,560,635, the disclosure of which is totally incorporated herein by reference, distearyl dimethyl ammonium bisulfate as disclosed in U.S. Pat. No. 4,937,1 57 and U.S. Pat. No. 4,560,635, the disclosures of each of which are totally incorporated herein by reference, stearyl dimethyl hydrogen ammonium tosylate, charge control agents as disclosed in U.S. Pat. No. 4,294,904, the disclosure of which is totally incorporated herein by reference, zinc 3,5-di-tert-butyl salicylate compounds, such as Bontron E-84, available from Orient Chemical Company of Japan, or zinc compounds as disclosed in U.S. Pat. No. 4,656,112, the disclosure of which is totally incorporated herein by reference, aluminum 3,5-di-tert-butyl salicylate compounds, such as Bontron E-88, available from Orient Chemical Company of Japan, or aluminum compounds as disclosed in U.S. Pat. No. 4,845, 003, the disclosure of which is totally incorporated herein by reference, and the like, as well as mixtures thereof and/or any other charge control agent suitable for dry electrophotographic toners. Additional examples of suitable charge control additives are disclosed in U.S. Pat. No. 4,560,635 and U.S. Pat. No. 4,294,904, the disclosures of each of which are totally incorporated herein by reference. Charge control agents are present in any effective amount, typically from about 0.1 to about 4 percent by weight, and more preferably from about 0.5 to about 1 percent by weight, although the amount can be outside this range.

The toner compositions can be prepared by any suitable method. For example, the components of the dry toner particles can be mixed in a ball mill, to which steel beads for agitation are added in an amount of approximately five times the weight of the toner. The ball mill can be operated at about 120 feet per minute for about 30 minutes, after which time the steel beads are removed. Dry toner particles for two-component developers generally have an average particle size of from about 6 to about 20 microns.

Another method, known as spray drying, entails dissolving the appropriate polymer or resin in an organic solvent such as toluene or chloroform, or a suitable solvent mixture. The toner colorant is also added to the solvent. Vigorous agitation, such as that obtained by ball milling processes, assists in assuring good dispersion of the colorant. The solution is then pumped through an atomizing nozzle while using an inert gas, such as nitrogen, as the atomizing agent.

The solvent evaporates during atomization, resulting in toner particles of a colored resin, which are then attrited and classified by particle size. Particle diameter of the resulting toner varies, depending on the size of the nozzle, and generally varies between about 0.1 and about 100 microns.

Another suitable process is known as the Banbury method, a batch process wherein the dry toner ingredients are pre-blended and added to a Banbury mixer and mixed, at which point melting of the materials occurs from the heat energy generated by the mixing process. The mixture is then dropped into heated rollers and forced through a nip, which results in further shear mixing to form a large thin sheet of the toner material. This material is then reduced to pellet form and further reduced in size by grinding or jetting, after which the particles are classified by size.

Another suitable toner preparation process, extrusion, is a continuous process that entails dry blending the toner ingredients, placing them into an extruder, melting and mixing the mixture, extruding the material, and reducing the extruded material to pellet form. The pellets are further reduced in size by grinding or jetting, and are then classified by particle size.

Other similar blending methods may also be used. Subsequent to size classification of the toner particles, any external additives are blended with the toner particles. If desired, the resulting toner composition is then mixed with carrier particles.

Any suitable external additives can also be utilized with the dry toner particles. The amounts of external additives are measured in terms of percentage by weight of the toner composition, but are not themselves included when calculating the percentage composition of the toner. For example, a toner composition containing a resin, a colorant, and an external additive can comprise 80 percent by weight resin and 20 percent by weight colorant; the amount of external additive present is reported in terms of its percent by weight of the combined resin and colorant. External additives can include any additives suitable for use in electrostatographic toners, including straight silica, colloidal silica (e.g. Aerosil R972®, available from Degussa, Inc.), ferric oxide, Unilin (a linear polymeric alcohol comprising a fully saturated hydrocarbon backbone with at least about 80 percent of the polymeric chains terminated at one chain end with a hydroxyl group, of the general formula $CH_3(CH_2)_nCH_2OH$, wherein n is a number from about 30 to about 300, and preferably from about 30 to about 50, available from Petrolite Chemical Company), polyethylene waxes, polypropylene waxes, polymethylmethacrylate, zinc stearate, chromium oxide, aluminum oxide, stearic acid, polyvinylidene fluoride (e.g. Kynara, available from Pennwalt Chemicals Corporation), and the like. External additives can be present in any desired or effective amount.

Dry toners of the present invention can be employed alone in single component development processes, or they can be employed in combination with carrier particles in two component development processes. Any suitable carrier particles can be employed with the toner particles. Typical carrier particles include granular zircon, steel, nickel, iron ferrites, and the like. Other typical carrier particles include nickel berry carriers as disclosed in U.S. Pat. No. 3,847,604, the entire disclosure of which is incorporated herein by reference. These carriers comprise nodular carrier beads of nickel characterized by surfaces of reoccurring recesses and protrusions that provide the particles with a relatively large external area. The diameters of the carrier particles can vary, but are generally from about 50 microns to about 1,000 microns, thus allowing the particles to possess sufficient density and inertia to avoid adherence to the electrostatic images during the development process.

Carrier particles can possess coated surfaces. Typical coating materials include polymers and terpolymers, including, for example, fluoropolymers such as polyvinylidene fluorides as disclosed in U.S. Pat. No. 3,526,533, U.S. Pat. No. 3,849,186, and U.S. Pat. No. 3,942,979, the disclosures of each of which are totally incorporated herein by reference. Coating of the carrier particles may be by any suitable process, such as powder coating, wherein a dry powder of the coating material is applied to the surface of the carrier particle and fused to the core by means of heat, solution coating, wherein the coating material is dissolved in a solvent and the resulting solution is applied to the carrier surface by tumbling, or fluid bed coating, in which the carrier particles are blown into the air by means of an air stream, and an atomized solution comprising the coating material and a solvent is sprayed onto the airborne carrier particles repeatedly until the desired coating weight is achieved. Carrier coatings may be of any desired thickness or coating weight. Typically, the carrier coating is present in an amount of from about 0.1 to about 1 percent by weight of the uncoated carrier particle, although the coating weight may be outside this range.

The toner is present in the two-component developer in any effective amount, typically from about 1 to about 5 percent by weight of the carrier, and preferably about 3 percent by weight of the carrier, although the amount can be outside these ranges.

Any suitable conventional electrophotographic development technique can be utilized to deposit toner particles of the present invention on an electrostatic latent image on an imaging member. Well known electrophotographic development techniques include magnetic brush development, cascade development, powder cloud development, electrophoretic development, and the like. Magnetic brush development is more fully described, for example, in U.S. Pat. No. 2,791,949, the disclosure of which is totally incorporated herein by reference; cascade development is more fully described, for example, in U.S. Pat. No. 2,618,551 and U.S. Pat. No. 2,618,552, the disclosures of each of which are totally incorporated herein by reference; powder cloud development is more fully described, for example, in U.S. Pat. No. 2,725,305, U.S. Pat. No. 2,918,910, and U.S. Pat. No. 3,015,305, the disclosures of each of which are totally incorporated herein by reference; and liquid development is more fully described, for example, in U.S. Pat. No. 3,084,043, the disclosure of which is totally incorporated herein by reference.

The deposited toner image can be transferred to the recording sheet, such as paper or transparency material, by any suitable technique conventionally used in electrophotography, such as corona transfer, pressure transfer, adhesive transfer, bias roll transfer, and the like. Typical corona transfer entails contacting the deposited toner particles with a sheet of paper or transparency stock and applying an electrostatic charge on the side of the sheet opposite to the toner particles. A single wire corotron having applied thereto a potential of between about 5000 and about 8000 volts provides satisfactory electrostatic charge for transfer.

After transfer, the transferred toner image can be fixed to the recording sheet. The fixing step can be also identical to that conventionally used in electrophotographic imaging. Typical, well known electrophotographic fusing techniques include heated roll fusing, flash fusing, oven fusing, laminating, adhesive spray fixing, and the like.

Liquid developers and liquid development processes for the development of electrostatic latent images are also known. In electrophoretic developers and processes, the liquid developers generally comprise a liquid vehicle and colored toner particles, and frequently also contain a charge control agent. The colored toner particles become charged, and upon contacting the electrostatic latent image with the liquid developer, the particles migrate through the liquid vehicle toward the charged image, thereby effecting development. Any residual liquid vehicle remaining on the image subsequent to development is evaporated or absorbed into the receiving sheet. Typically, liquid developers employ hydrocarbon liquid vehicles, most commonly high boiling aliphatic hydrocarbons that are relatively high in resistivity and nontoxic. Developers and processes of this type are disclosed in, for example, U.S. Pat. No. 4,476,210, U.S. Pat. No. 2,877,133, U.S. Pat. No. 2,890,174, U.S. Pat. No. 2,899,335, U.S. Pat. No. 2,892,709, U.S. Pat. No. 2,913,353, U.S. Pat. No. 3,729,419, U.S. Pat. No. 3,841,893, U.S. Pat. No. 3,968,044, U.S. Pat. No. 4,794,651, U.S. Pat. No. 4,762,764, U.S. Pat. No. 4,830,945, U.S. Pat. No. 4,686,936, U.S. Pat. No. 4,766,049, U.S. Pat. No. 4,707,429, U.S. Pat. No. 4,780,388, U.S. Pat. No. 3,976,808, U.S. Pat. No. 4,877,698, U.S. Pat. No. 4,880,720, and U.S. Pat. No. 4,880,432, the disclosures of each of which are totally incorporated herein by reference.

In polarizable liquid development processes, as disclosed in U.S. Pat. No. 3,084,043 (Gundlach), the disclosure of which is totally incorporated herein by reference, liquid developers having relatively low viscosity and low volatility and relatively high electrical conductivity (relatively low volume resistivity) are deposited on a gravure roller to fill the depressions in the roller surface. Excess developer is removed from the lands between the depressions, and as a receiving surface charged in image configuration passes near the gravure roller, liquid developer is attracted from the depressions onto the receiving surface in image configuration by the charged image. Developers and processes of this type are disclosed in, for example, U.S. Pat. No. 4,047,943, U.S. Pat. No. 4,059,444, U.S. Pat. No. 4,822,710, U.S. Pat. No. 4,804,601, U.S. Pat. No. 4,766,049, Canadian Patent 937,823, Canadian Patent 926,182, Canadian Patent 942,554, British Patent 1,321,286, and British Patent 1,312,844, the disclosures of each of which are totally incorporated herein by reference.

The present invention also includes processes wherein liquid developers for developing electrostatic latent images which contain a Raman-detectable component are used to develop an electrostatic latent image, either directly on a recording sheet or on an imaging member, followed by transfer of the developed image to a recording sheet. Liquid developers suitable for polarizable liquid development processes can comprise a nonaqueous liquid vehicle, a Raman-detectable component, and, optionally and if desired, a colorant. When the liquid developer is intended for use in a polarizable liquid development system, the liquid developer is applied to an applicator such as a gravure roll and brought near an electrostatic latent image. The charged image polarizes the liquid developer in the depressions in the applicator, thereby drawing the developer from the depressions and causing it to flow to the image bearing member to develop the image. For this application, the liquid developer is somewhat more viscous than is the situation with electrophoretic development, since particle migration within the developer is generally not necessary and since the liquid developer must be sufficiently viscous to remain in the depressions in the applicator prior to development. The viscosity, however, remains significantly lower than that typically observed for many printing inks, since the liquid developer must be capable of being pulled from the depressions in the applicator roll by the force exerted by the electrostatic latent image. Thus, liquid developers for use in polar development systems typically have a viscosity of from about 25 to about 500 centipoise at the operating temperature of the copier or printer, and preferably from about 30 to about 300 centipoise at the machine operating temperature, although the viscosity can be outside these ranges. In addition, liquid developers intended for use in polarizable liquid development systems typically have a resistivity lower than liquid developers employed in electrophoretic development systems to enable the developer to become polarized upon entering proximity with the electrostatic latent image. The liquid developers of the present invention, however, generally have resistivities that are significantly higher than the resistivities of typical printing inks, for which resistivities generally are substantially less than about $10^9$ ohm-cm. Typically, liquid developers for polarizable liquid development systems have a resistivity of from about $10^8$ to about $10^{11}$ ohm-cm, and preferably from about $2\times10^9$ to about $10^{10}$ ohm-cm, although the resistivity can be outside these ranges.

In polarizable liquid developers for the present invention the Raman-detectable component is present in the developer in any effective amount, typically from about 5 to about 80 percent by weight, preferably from about 20 to about 80 percent by weight, although the amount can be outside these ranges.

Typical liquid materials suitable as liquid vehicles for polarizable liquid developers include Magiesols, such as Magiesol 60, a highly refined petroleum distillate which has essentially a zero vapor pressure at ambient temperature, available from Magie Oil Company, Illinois; Witsol 50, available from Witco Inc.; Isopar V, available from Exxon Chemical; Paraflex HT-10, available from Gulf Inc. of Canada; Shellflex 210 and Shellflex 270, available from Shell Chemical Company; Parabase, available from Shell Chemical Company; mineral oil; vegetable oil, such as castor oil and its oxidized derivatives; peanut oil; coconut oil; sunflower seed oil; corn oil; rape seed oil; sesame oil; mineral spirits; fluorocarbon oils, such as Du Pont's Freon solvents and Krytox oils; silicone oils; kerosene; carbon tetrachloride; toluene; drying oils such as linseed oil and tung oil; highly purified polypropylene glycol; butoxytriglycol; dibutyl phthalate; and the like, as well as mixtures thereof. The liquid vehicle is present in the liquid developer in a major amount, typically from about 20 to about 99 percent by weight, preferably from about 60 to about 98 percent by weight, and more preferably from about 80 to about 95 percent by weight, although the amount can be outside these ranges.

If desired, the polarizable liquid developers for the present invention can also contain a colorant. Any suitable colorant can be employed, including pigment particles, dyes, and the like. The colorant is present in any amount effective to impart to the liquid the desired color and intensity.

If desired, the polarizable liquid developers for the present invention can also contain various polymers added to modify the viscosity of the developer or to modify the mechanical properties of the developed or cured image such as adhesion or cohesion. In particular, when the liquid developer for the present invention is intended for use in polarizable liquid development processes, the developer can also include viscosity controlling agents. Examples of suitable viscosity controlling agents include thickeners such as alkylated polyvinyl pyrrolidones, such as Ganex V216, available from GAF; polyisobutylenes such as Vistanex, available from Exxon Corporation, Kalene 800, available from Hardman Company, New Jersey, ECA 4600, available from Paramins, Ontario, and the like; Kraton G-1701, a block copolymer of polystyrene-b-hydrogenated butadiene available from Shell Chemical Company, Polypale Ester 10, a glycol rosin ester available from Hercules Powder Company; and other similar thickeners. In addition, additives such as pigments, including silica pigments such as Aerosil 200, Aerosil 300, and the like available from Degussa, Bentone 500, a treated montmorillonite clay available from NL Products, and the like can be included to achieve the desired developer viscosity. Additives are present in any effective amount, typically from about 1 to about 40 percent by weight in the case of thickeners and from about 0.5 to about 5 percent by weight in the case of pigments and other particulate additives, although the amounts can be outside these ranges.

In addition, liquid developers for the present invention intended for use in polarizable liquid development processes can also contain conductivity enhancing agents. For example, the developers can contain additives such as quaternary ammonium compounds as disclosed in, for example, U.S. Pat. No. 4,059,444, the disclosure of which is totally incorporated herein by reference.

In another embodiment of the present invention, liquid developers comprise a nonaqueous liquid vehicle, a charge control agent, and toner particles which either include or consist of a Raman-detectable component. In one embodiment, the toner particles comprise a mixture of a resin and a Raman-detectable component. Optionally and if desired, the toner particles can also contain a colorant, such as a pigment or dye. Liquid developers of this embodiment of the present invention can be employed in either electrophoretic development processes or polarizable liquid development processes. When employed in polarizable liquid development processes, the developer generally has the characteristics set forth hereinabove with respect to polarizable liquid developers. When the liquid developer is intended for use in electrophoretic development systems, the liquid vehicle must be capable of permitting the toner particles of the developer to migrate through the vehicle to develop electrostatic latent images. Thus, in electrophoretic developers, the liquid vehicle is sufficiently high in resistivity to enhance the development of particles over that of free ions, typically having a resistivity of more than about $5 \times 10^9$ ohm-cm and preferably more than about $10^{10}$ ohm-cm as measured by determining the average current flowing across a 1.5 millimeter gap at 5 hertz and 5 volts square wave applied potential, although the resistivity can be outside these ranges. In addition, the liquid vehicle is sufficiently low in viscosity to permit the toner particles to migrate toward the electrostatic latent image with sufficient rapidity to enable development of the image within the desired development time. Typically, the liquid vehicle has a viscosity of no more than about 20 centipoise at the operating temperature of the copier or printer, and preferably no more than about 3 centipoise at the machine operating temperature, although the viscosity can be outside these ranges.

Typical liquid materials suitable as liquid vehicles for electrophoretic liquid developers include high purity aliphatic hydrocarbons with, for example, from about 6 to about 25 carbon atoms and preferably with a viscosity of less than 2 centipoise, such as Norpar®12, Norpar®13, and Norpar®15, available from Exxon Corporation, isoparafinic hydrocarbons such as Isopar® G, H, K, L, M, and V, available from Exxon Corporation, Amsco® 460 Solvent, Amsco® OMS, available from American Mineral Spirits Company, Soltrol®, available from Phillips Petroleum Company, Pagasols, available from Mobil Oil Corporation, Shellsol®, available from Shell Oil Company, and the like, as well as mixtures thereof. Isoparaffinic hydrocarbons are preferred liquid media, since they are colorless, environmentally safe, and have desirable vapor pressures. The liquid vehicle is present in the liquid developer in a major amount, typically from about 80 to about 99 percent by weight, preferably from about 90 to about 98 percent by weight, and more preferably from about 95 to about 98 percent by weight, although the amount can be outside these ranges.

The toner particles in one embodiment generally comprise a polymeric material and a Raman-detectable component, as well as a colorant if desired. These developers can also contain two different kinds of toner particles, namely those containing a resin and a Raman-detectable component, and those containing a resin and a colorant. Generally, the polymer is substantially insoluble in the liquid vehicle at the operating temperature of the imaging apparatus into which the developer will be incorporated, so that the toner particles containing the resin are of a particle diameter of greater than about 0.1 micron. Examples of suitable polymers include ethylene-vinyl acetate copolymers such as the Elvax® I resins available from E. I. Du Pont de Nemours & Company, copolymers of ethylene and an $\alpha,\beta$-ethylenically unsaturated acid selected from acrylic or methacrylic acid, where the acid moiety is present in an amount of from 0.1 to 20 percent by weight, such as the Nucrel® II resins available from E. I. Du Pont de Nemours & Company, polybutyl terephthalates, ethylene ethyl acrylate copolymers such as those available as Bakelite DPD 6169, DPDA 6182 Natural, and DTDA 9169 Natural from Union Carbide Company, ethylene vinyl acetate resins such as DQDA 6479 Natural 7 and DQDA 6832 Natural 7 available from Union Carbide Company, methacrylate resins such as polybutyl methacrylate, polyethyl methacrylate, and polymethyl methacrylate, available under the trade name Elvacite from E. I. Du Pont de Nemours & Company, and others as disclosed in, for example, British Patent 2,169,416 and U.S. Pat. No. 4,794,651, the disclosures of which are totally incorporated herein by reference.

The toner particles are contained in the developer in any amount effective to impart to the developer the desired intensity of the Raman-detectable image. Typically, the toner particles containing the Raman-detectable component are present in the liquid developer in an amount of from about 1 to about 50 percent by weight, and preferably from about 1 to about 7 percent by weight, although the amount can be outside these ranges.

The liquid developers for the present invention containing toner particles comprising a resin and a Raman-detectable component generally can be prepared by any suitable method. For example, the developer can be prepared by heating and mixing the ingredients, followed by grinding the mixture in an attritor until homogeneity of the mixture has been achieved. Additional information regarding methods of preparing toner particles is disclosed in, for example, U.S. Pat. No. 4,476,210, U.S. Pat. No. 4,794,651, U.S. Pat. No. 4,877,698, U.S. Pat. No. 4,880,720, U.S. Pat. No. 4,880,432, U.S. Pat. No. 4,762,764, U.S. Pat. No. 3,729,419, U.S. Pat. No. 3,841,893, and U.S. Pat. No. 3,968,044, the disclosures of each of which are totally incorporated herein by reference.

In another embodiment, liquid developers for the present invention suitable for electrophoretic development processes comprise a nonaqueous liquid vehicle, a charge control agent, a polymeric material soluble in the liquid vehicle, and a Raman-detectable component. The Raman-detectable component is present in the form of solid particles which become charged by the charge control agent and are capable of migrating through the liquid vehicle to develop latent electrostatic images, and the polymer assists in fixing the Raman-detectable component particles to the recording sheet bearing the developed image as well as in stabilizing the Raman-detectable component particles in the developer. The liquid vehicle is generally as described hereinabove with respect to electrophoretic liquid developers. The Raman-detectable component particles are present in the liquid developer in any effective amount, typically from about 5 to about 80 percent by weight, preferably from about 50 to about 80 percent by weight, although the amount can be outside these ranges.

In this embodiment, the electrophoretic liquid developer also contains a polymeric material soluble in the liquid medium. By soluble, it is meant that the polymeric material can be dissolved in the liquid medium in amounts of at least about 5 to about 10 percent by weight at the operating temperature of the liquid developer during development and at those temperatures to which the developer will be exposed during shipment and storage. Preferably, the polymeric material is soluble in the liquid medium at temperatures of about −20° C. or lower, and also soluble at temperatures of about 70° C. or higher, as well as being soluble between these temperatures. This temperature range of from about −20°C. to about 70° C. represents the temperatures to which it can be expected that a liquid developer might be exposed during shipment or storage; the polymer may exhibit solubility in the liquid medium within a narrower or broader temperature range, provided that the objectives of the present invention are achieved. Examples of suitable polymers for this embodiment of the present invention include poly(2-ethyl hexylmethacrylate); poly(isobutylene-co-isoprenes), such as Kalene 800, available from Hardman Company N.J.; polyvinyl toluene-based copolymers, including vinyl toluene acrylic copolymers such as Pliolite OMS, available from the Goodyear Tire and Rubber Company; block copolymers such as poly(styrene-b-hydrogenated butadiene), including Kraton G 1701, available from Shell Chemical Company; and the like, as well as mixtures thereof. The polymer becomes adsorbed onto the surfaces of the Raman-detectable component particles in the liquid developer and functions as a stabilizer to maintain distance between the Raman-detectable component particles and prevent agglomeration and precipitation of the particles in the developer. Generally, the polymer is present in the liquid developer in an amount of from about 0.5 to about 15 percent by weight, and preferably from about 1 to about 5 percent by weight.

If desired, the liquid developer can also contain colorant particles, such as pigment particles.

The liquid developer in this embodiment generally can be prepared by heating and mixing the ingredients, followed by grinding the mixture in an attritor until homogeneity of the mixture has been achieved, generally for about one hour. Subsequently, the charge control agent is added to the mixture to yield the liquid developer. Subsequent to the preparation of this developer composition, the particles generally possess a charge to mass ratio of from about 50 to 2,000 microcoulombs per gram.

The liquid developers for this embodiment of the invention are useful in known imaging and printing processes. These liquid developers may be employed in imaging methods wherein an electrostatic latent image is formed on an imaging member, developed with the developer composition illustrated herein, transferred to a suitable recording sheet such as paper or transparency material, and thereafter optionally permanently affixed thereto. In addition, these liquid developers can be employed for direct printing processes, including, for example, the printing process employed by the Versatec® V-80 printer. In direct or stylus writing printing processes, a paper sheet coated with a dielectric or electrically insulating polymer coating is placed between a series of styli situated near one surface of the paper and an electrode situated near the opposite surface of the paper. Generation of an electric field between the styli and the electrode results in electrical breakdown of the air between the styli and the paper, thereby generating ions that adhere to the paper. Thus, by generating an electrical field between specific styli and the electrode in imagewise fashion, ions are deposited on the paper in imagewise fashion to form an electrostatic latent image. The paper bearing the latent image is then contacted with the liquid developer for the present invention comprising a liquid medium, Raman-detectable component particles, a polymer soluble in the liquid medium, and a charge control agent, the particles in said developer having a charge opposite to that of the latent image, resulting in development of the latent image. Subsequently, the liquid medium evaporates from the paper and the particles adhere to the paper in imagewise fashion. Generally, fusing of the particles to the substrate is not necessary. Further information concerning direct or stylus writing printing processes is disclosed, for example, U.S. Pat. Nos. 2,919,171; 3,564,556; 3,693,185; 3,793,107; 3,829,185; 4,042,939; 3,729,123; 3,859,960; 3,937,177; 3,611,419; 4,569,584; 4,240,084; 4,524,371; and 4,322,469, the disclosures of each of which are totally incorporated herein by reference.

The electrophoretic liquid developers for the present invention can also include a charge control agent to help impart a charge to the toner particles. A charge control additive is generally present in the electrophoretic liquid developers of the present invention to impart to the particles contained in the liquid a charge sufficient to enable them to migrate through the liquid vehicle to develop an image. Examples of suitable charge control agents for liquid developers include the lithium, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper, lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum resinate, aluminum salt of 3,5 di-t-butyl gamma resorcylic acid. Mixtures of these materials may also be used. Particularly preferred charge control agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc with heptanoic acid; salts of barium, aluminum, cobalt, manganese, zinc, cerium, and zirconium octoates; salts of barium, aluminum, zinc, copper, lead, and iron with stearic acid; iron naphthenate; and the like, as well as mixtures thereof. The charge control additive may be present in an amount of from about 0.001 to about 3 percent by weight, and preferably from about 0.01 to about 0.8 percent by weight of the developer composition. Other additives, such as charge adjuvants added to improve charging characteristics of the developer, may be added to the developers of the present invention, provided that the objectives of the present invention are achieved. Charge adjuvants such as stearates, metallic soap additives, polybutylene succinimides, and the like are described in references such as U.S. Pat. No. 4,707,429, U.S. Pat. No. 4,702,984, and U.S. Pat. No. 4,702,985, the disclosures of each of which are totally incorporated herein by reference.

In general, images are developed with the liquid electrophoretic developers and the polarizable liquid developers for the present invention by generating an electrostatic latent image and contacting the latent image with the liquid developer, thereby causing the image to be developed. When a liquid electrophoretic developer for the present invention is employed, the process entails generating an electrostatic latent image and contacting the latent image with the developer comprising a liquid vehicle and charged toner particles, thereby causing the charged particles to migrate through the liquid and develop the image. Developers and processes of this type are disclosed in, for example, U.S. Pat. No. 4,804,601, U.S. Pat. No. 4,476,210, U.S. Pat. No. 2,877,133, U.S. Pat. No. 2,890,174, U.S. Pat. No. 2,899,335, U.S. Pat. No. 2,892,709, U.S. Pat. No. 2,913,353, U.S. Pat. No. 3,729,419, U.S. Pat. No. 3,841,893, U.S. Pat. No. 3,968,044, U.S. Pat. No. 4,794,651, U.S. Pat. No. 4,762,764, U.S. Pat. No. 4,830,945, U.S. Pat. No. 3,976,808, U.S. Pat. No. 4,877,698, U.S. Pat. No. 4,880,720, U.S. Pat. No. 4,880,432, and copending application U.S. Ser. No. 07/300,395, now issued U.S. Pat. No. 5,030,535, the disclosures of each of which are totally incorporated herein by reference. When a liquid developer for the present invention suitable for polarizable liquid development processes is employed, the process entails generating an electrostatic latent image on an imaging member, applying the liquid developer to an applicator, and bringing the applicator into sufficient proximity with the latent image to cause the image to attract the developer onto the imaging member, thereby developing the image. Developers and processes of this type are disclosed in, for example, U.S. Pat. No. 4,047,943, U.S. Pat. No. 4,059,444, U.S. Pat. No. 4,822,710, U.S. Pat. No. 4,804,601, U.S. Pat. No. 4,766,049, U.S. Pat. No. 4,686,936, U.S. Pat. No. 4,764,446, Canadian Patent 937,823, Canadian Patent 926,182, Canadian Patent 942,554, British Patent 1,321,286, and British Patent 1,312,844, the disclosures of each of which are totally incorporated herein by reference. In both of these embodiments, any suitable means can be employed to generate the image. For example, a photosensitive imaging member can be exposed by incident light or by laser to generate a latent image on the member, followed by development of the image and transfer to a recording sheet such as paper, transparency material, cloth, or the like. In addition, an image can be generated on a dielectric imaging member by electrographic or ionographic processes as disclosed, for example, in U.S. Pat. No. 3,564,556, U.S. Pat. No. 3,611,419, U.S. Pat. No. 4,240,084, U.S. Pat. No. 4,569,584, U.S. Pat. No. 2,919,171, U.S. Pat. No. 4,524,371, U.S. Pat. No. 4,619,515, U.S. Pat. No. 4,463,363, U.S. Pat. No. 4,254,424, U.S. Pat. No. 4,538,163, U.S. Pat. No. 4,409,604, U.S. Pat. No. 4,408,214, U.S. Pat. No. 4,365,549, U.S. Pat. No. 4,267,556, U.S. Pat. No. 4,160,257, U.S. Pat. No. 4,485,982, U.S. Pat. No. 4,731,622, U.S. Pat. No. 3,701,464, and U.S. Pat. No. 4,155,093, the disclosures of each of which are totally incorporated herein by reference, followed by development of the image and, if desired, transfer to a recording sheet. If necessary, transferred images can be fused to the recording sheet by any suitable means, such as by heat, pressure, exposure to solvent vapor or to sensitizing radiation such as ultraviolet light or the like as well as combinations thereof. Further, the liquid developers for the present invention can be employed to develop electrographic images wherein an electrostatic image is generated directly onto a recording sheet by electrographic or ionographic processes and then developed, with no subsequent transfer of the developed image to an additional recording sheet.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording sheet. In drop-on-demand systems, a droplet is expelled from an orifice directly to a position on a recording sheet in accordance with digital data signals. A droplet is not formed or expelled unless it is to be placed on the recording sheet.

Drop-on-demand systems require no ink recovery, charging, or deflection. There are two types of drop-on-demand ink jet systems. One type of drop-on-demand system has as its major components an ink filled channel or passageway having a nozzle on one end and a transducer, which can be mechanical, piezoelectric, or the like, near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops and the bubble collapses, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands as the excess heat is used to convert liquid to vapor, which removes heat due to heat of vaporization or diffuses away. The expansion of the bubble forces a droplet of ink out of the nozzle. Once the excess heat is lost, the bubble collapses on the resistor. At this point, the resistor is no longer being heated because the current pulse has passed and the droplet is propelled at a high rate of speed towards the recording medium. This entire bubble formation and collapse sequence occurs in about 10 microseconds. Subsequently, the ink channel refills by capillary action. This typically is not refired for about 100 to 500 microseconds minimum dwell time to enable the channel to refill and to enable the ink motion to dampen. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

In a liquid ink composition such as an aqueous ink jet ink, the Raman-detectable component typically is present in the ink in an amount of from about 5 to about 80 percent by weight, and preferably from about 50 to about 80 percent by weight, although the amount can be outside these ranges.

Aqueous ink compositions, such as those suitable for use in ink jet printing, particularly thermal ink jet printing, generally contain a humectant in addition to water as the liquid vehicle. The humectant typically is an organic material miscible with water. Examples of suitable humectants include ethylene glycol, propylene glycol, diethylene glycols, glycerine, dipropylene glycols, polyethylene glycols, polypropylene glycols, amides, urea, substituted ureas, ethers, carboxylic acids, esters, alcohols, organosulfides, organosulfoxides, sulfones (such as sulfolane), alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, and other water miscible materials, as well as mixtures thereof. The humectant can be present in the ink composition in any effective amount. Typically, the the water to organic ratio is from about 100:0 to about 30:70, preferably from about 97:3 to about 50:50, although the ratio can be outside this range.

Optionally, if it is desired to generate images that are visible with the naked eye, the ink composition can also contain a colorant. The colorant for the inks for the present invention can be a dye. Examples of suitable dyes are disclosed in, for example, U.S. Pat. No. 4,877,451, U.S. Pat. No. 5,017,644, and U.S. Pat. No. 5,019,166, the disclosures of each of which are incorporated herein by reference. Specific examples of suitable dyes include anthraquinones, monoazo dyes, disazo dyes, phthalocyanines, aza[18] annulenes, formazan copper complexes, triphenodioxazines, Bernacid Red 2BMN; Pontamine Brilliant Bond Blue A; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Direct Brilliant Pink B (Crompton-Knolls); Aizen Spilon Red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Sirius Supra Yellow GD 167; Cartasol Brilliant Yellow 4GF (Sandoz); Pergasol Yellow CGP (Ciba-Geigy); Dermacarbon 2GT (Sandoz); Pyrazol Black BG (ICI); Morfast Black Conc A (Morton-Thiokol); Diazol Black RN Quad (ICI); Luxol Blue MBSN (Morton-Thiokol); Sevron Blue SGMF (ICI); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Co. (Japan), the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), and the like, as well as mixtures thereof. The dye is present in any effective amount, typically from about 1 to about 20 percent by weight, and preferably from about 2 to about 6 percent by weight, although the amount can be outside these ranges.

In addition, the optional colorant for the ink compositions for the present invention can be a pigment, or a mixture of one or more dyes and/or one or more pigments. The pigment can be black, cyan, magenta, yellow, red, blue, green, brown, mixtures thereof, and the like. Specific examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as Cl 60710, Cl Dispersed Red 15, a diazo dye identified in the Color Index as Cl 26050, Cl Solvent Red 19, and the like. Illustrative examples of suitable cyan pigments include copper tetra-4-(octadecyl sulfonamido) phthalocyanine, X-copper phthalocyanine pigment, listed in the color index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G10 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Additional suitable commercially available pigment dispersions include the Hostafines available from Hoechst, including Hostafine Black T, Hostafine Black TS, Hostafine Yellow HR, Hostafine Yellow GR, Hostafine Red FRLL, Hostafine Rubine F6B, and Hostafine Blue B2G, as well as dispersions available from BASF, including Disperse Black 00-6607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 microns, although the particle size can be outside these ranges. The pigment is present in the ink composition in any effective amount, typically from about 1 to about 20 percent by weight and preferably from about 4 to about 8 percent by weight, although the amount can be outside these ranges.

Other additives can also be present in the inks. For example, one or more surfactants or wetting agents can be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are typical polymeric additives. Polymeric additives can be present in the ink of the present invention in amounts of from 0 to about 10 percent by weight, and preferably from about 0.01 to about 5 percent by weight, although the amount can be outside this range.

One example of an additive to the inks is a polymeric additive consisting of two polyalkylene oxide chains bound to a central bisphenol-A-type moiety. This additive is of the formula

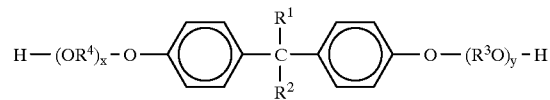

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

For thermal ink jet printing applications, the ink compositions are generally of a viscosity suitable for use in thermal ink jet printing processes. Typically, the ink viscosity is no more than about 5 centipoise, and preferably is from about 1 to about 2.5 centipoise, although the viscosity can be outside this range. Inks suitable for piezoelectric drop-ondemand printing or continuous stream printing can also be prepared containing a Raman-detectable component according to the present invention.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention also includes a process which entails incorporating an ink composition containing a Raman-detectable component into an ink jet printing apparatus and causing droplets of the ink composition to be ejected in an imagewise pattern onto a recording sheet. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable recording sheet can be employed, including plain papers such as Xerox® 4024 papers, ruled notebook paper, bond paper, silica coated papers such as Sharp Company silica coated paper, JuJo paper, and the like, transparency materials, fabrics, textile products, plastics, opaque filled plastics, polymeric films, inorganic substrates such as metals and wood, and the like.

While the above discussion of ink jet printing materials, processes, and apparatus is generally directed to processes wherein an ink which is liquid at room temperature is used, hot melt ink jet printing processes and materials are also suitable for the present invention. In hot melt ink jet printing processes, the ink is a solid or a viscous liquid at room temperature and is heated to a temperature suitable for jetting prior to imaging. Hot melt ink jet printing apparatus and processes are disclosed in, for example, U.S. Pat. No. 5,006,170, U.S. Pat. No. 5,122,187, U.S. Pat. No. 4,490,731, U.S. Pat. No. 4,751,528, and U.S. Pat. No. 4,791,439, the disclosures of each of which are totally incorporated herein by reference.

In addition, a second marking material that is substantially free of a Raman-detectable component can be applied to form alphanumeric images on a recording sheet that already comprises a Raman-detectable mark.

In a specific embodiment of the present invention, images are generated on a substrate by an electrophotographic, ionographic, or electrographic process, and additional images are also generated on the substrate by an ink jet printing process. One embodiment of the present invention is directed to a process for generating images which comprises generating an electrostatic latent image on an imaging member in an imaging apparatus; developing the latent image with a toner comprising a resin and a colorant; transferring the developed image to a recording sheet; optionally permanently affixing the transferred image to the recording sheet; and causing droplets of an ink composition comprising an aqueous liquid vehicle, an optional colorant, and a Raman-detectable component to be ejected in an imagewise pattern onto the recording sheet.

The Raman-detectable component can also be applied to the recording sheet by any other printing or imaging process, such as lithography, thermal transfer printing (for example, by incorporating a Raman-detectable component into a thermal transfer film), encapsulated marking material printing, impact printing (for example, by incorporating a Raman detectable component into an impact printer ribbon such as a dot matrix or typewriter ribbon), silk screen printing, pens, brushes, or the like.

When an image has been generated on a recording sheet with a marking material containing a Raman-detectable component, the image is then irradiated with monochromatic radiation at a wavelength at which the Raman-detectable component emits a Raman signal. Preferably, the irradiation wavelength is in the near-infrared region, more preferably in the wavelength range of from about 680 to about 1400 nanometers, although the irradiation wavelength may be outside this range. The mark on the recording sheet is irradiated with monochromatic radiation, such as that obtainable from a laser. The Raman effect itself is independent of the wavelength of incident radiation, but other considerations can lead to selection of a preferred wavelength for incident radiation. For example, since Raman scattering increases as the fourth power of the frequency of incident radiation, selection of the shortest possible wavelength is preferred for increasing signal strength. At lower wavelengths, however, difficulties such as photodecomposition of the material and fluorescence can be encountered. The ideal wavelength will vary, depending on the specific Raman-detectable component selected. Examples of suitable monochromatic radiation light sources include a neodymium YAG laser, which provides radiation at a wavelength of 1064 nanometers, a He—Ne laser, which provides radiation at a wavelength of 633 nm, a Kr ion laser, which provides radiation at a wavelength of 568 nm, an Ar ion laser, which provides radiation at wavelengths of 488 nm and 515 nm, or the like. For the purposes of the present invention, the term "monochromatic", when used with respect to the wavelength of radiation used to irradiate the marking material, means that all of the radiation which is generated by the radiation source has a wavelength that is within about 50 nanometers of the wavelength indicated for that source. Lasers are preferred as a radiation source because they are monochromic, coherent, and sustain a very high intensity, which aids in analysis of the signal. Further, lasers have very small spot size, which also is desirable in the analysis of hidden marks since the marks can be very small in size while still generating the Raman scattering.

Subsequent to or during irradiation of the image on the recording sheet, the Raman spectrum of the radiation scattered from the marking material is measured. Detection can be accomplished with any standard FT-Raman instruments, such as the equipment available from BOMEM Corporation, Maarssen, Netherlands. Detection can be accomplished at any collection angle, although 180 degrees is generally preferred for maximum intensity. Samples can be measured by this technique with volumes of 1 cubic millimeter or less.

The Raman spectrum of the mark can be used in any desired manner. For example, software associated with the apparatus can be relatively simple and detect the presence or absence of one or more identifying peaks for a particular compound, subsequently giving a "yes" or "no" response to whether the compound has been detected. Since the Raman spectrum is unique for each chemical compound, it can also function as a "fingerprint" for that material. Thus, software associated with the apparatus can compare the measured spectrum from the recording sheet to a data bank containing the Raman spectra of several compounds and then indicate the identity of the compound on the recording sheet. Further, mixtures of Raman-detectable components can be employed; in this instance, their Raman spectra are superimposed on each other, and software associated with the apparatus can look for the unique spectrum formed from the superimposed spectra of each individual component contained in the mixture. Examples of apparatus suitable for this process include those available from Bomen Corporation, St. Jean Baptiste, Quebec, Canada and the like. Examples of software products for comparing Raman spectra with a library of reference materials include those available from Sadtler Research Laboratories, Philadelphia, Pa. and the like.

The Raman-detectable mark can be employed for any desired purpose. Examples of purposes include those disclosed in, for example, U.S. Pat. No. 5,225,900 and U.S. Pat. No. 5,301,044, the disclosures of each of which are totally incorporated herein by reference.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A squaraine compound of the formula

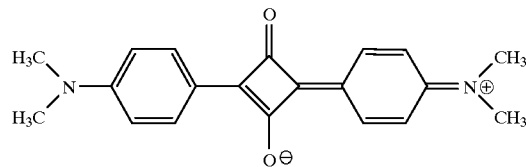

was prepared as described in H.-E. Sprenger and W. Ziegenbein, *Angewandte Chemie International Edition*, Vol. 5, no. 10, p. 894, the disclosure of which is totally incorporated herein by reference. The isolated compound in powdered form was applied to a sheet of Xerox® 4024 plain paper as a small dot. The compound was applied to the paper by pressing the material into the paper with a spatula and removing loose material by gently blowing the area with a stream of nitrogen. The paper thus treated was placed into the sample compartment of a Raman spectrometer. The spectrometer used was a Perkin-Elmer 1760 near-infrared Fourier transform spectrometer modified as described in F. J. Bergin and H. F. Shurvell, *Applied Spectroscopy*, vol. 43, no. 3, pp. 516–522 (1989), the disclosure of which is totally incorporated herein by reference. To obtain the spectrum, the paper was aligned so that the Nd YAG laser impinged on the treated spot. The Raman signal obtained from the treated spot was compared to the signal obtained from an untreated spot on the same paper, and a strong signal characteristic of the squaraine compound was recorded.

EXAMPLE II

The process of Example I is repeated except that the 4024 plain paper is replaced with a substantially transparent sheet of Mylar® polyester. The transparency is aligned so that the Nd YAG laser impinges on the treated spot. The Raman signal obtained from the treated spot is compared to the signal obtained from an untreated spot on the same transparent sheet, and it is believed that a strong signal characteristic of the squaraine compound will be recorded.

EXAMPLE III

The process of Example I is repeated except that the 4024 plain paper is replaced with a glass surface. The glass surface is aligned so that the Nd YAG laser impinges on the treated spot. The Raman signal obtained from the treated spot is compared to the signal obtained from an untreated spot on the same glass surface, and it is believed that a strong signal characteristic of the squaraine compound will be recorded.

EXAMPLE IV

The process of Example I is repeated except that the 4024 plain paper is replaced with an aluminum plate. The aluminum plate is aligned so that the Nd YAG laser impinges on the treated spot. The Raman signal obtained from the treated spot is compared to the signal obtained from an untreated spot on the same aluminum plate, and it is believed that a strong signal characteristic of the squaraine compound will be recorded.

EXAMPLE V

Dry toner compositions suitable for developing electrostatic images are prepared as follows. 85 parts by weight of a styrene-butadiene copolymer containing 89 percent by weight styrene and 11 percent by weight butadiene (Pliotone®, available from Goodyear Tire and Rubber Company) and 1 part by weight of distearyl dimethyl ammonium methyl sulfate (available from Hexcel Corporation), are melt blended in an extruder wherein the die is maintained at a temperature of between 130 and 145° C. and the barrel temperature ranges from about 80 to about 100° C., followed by micronization and air classification to yield resin particles of a size of 11.5 microns in volume average diameter. These resin particles are then admixed with a Raman-detectable material (bis(4-dimethylamino-2-hydroxy-6-methylphenyl)squaraine, prepared as described in U.S. Pat. No. 4,552,822, the disclosure of which is totally incorporated herein by reference) in relative ratios of from about 80 percent by weight resin and about 20 percent by weight Raman-detectable material to about 20 percent by weight resin and about 80 percent by weight Raman-detectable material to form toner compositions.

Red dry toner compositions suitable for developing electrostatic images are prepared as follows. 85 parts by weight of a styrene-butadiene copolymer containing 89 percent by weight styrene and 11 percent by weight butadiene (Pliotone®, available from Goodyear Tire and Rubber Company), 1 part by weight of distearyl dimethyl ammonium methyl sulfate, available from Hexcel Corporation, 13.44 parts by weight of a 1:1 blend of styrene-n-butylmethacrylate and Lithol Scarlet NB3755 from BASF, and 0.56 parts by weight of Hostaperm Pink E from Hoechst Corporation are melt blended in an extruder wherein the die is maintained at a temperature of between 130 and 145° C. and the barrel temperature ranges from about 80 to about 100° C., followed by micronization and air classification to yield toner particles of a size of 11.5 microns in volume average diameter. These red particles are then admixed with a Raman-detectable material (bis(4-dimethylamino-2-hydroxy-6-methylphenyl)squaraine, prepared as described in U.S. Pat. No. 4,552,822) in relative ratios of from about 80 percent by weight resin and about 20 percent by weight Raman-detectable material to about 20 percent by weight resin and about 80 percent by weight Raman-detectable material to form red toner compositions.

The toners thus prepared are then optionally blended with 0.3 parts by weight of Aerosil® R972 and 0.3 parts by weight of zinc stearate onto the surface of the toner particles in a Lodige blender.

A carrier composition is prepared by solution coating a Hoeganoes Anchor Steel core with a particle diameter range of from about 75 to about 150 microns, available from Hoeganoes Company, with 1 part by weight of a coating comprising 20 parts by weight of Vulcan carbon black, available from Cabot Corporation, homogeneously dispersed in 80 parts by weight of polymethylmethacrylate. The carrier is coated by a solution coating process from a methyl ethyl ketone solvent and the dry coating is present in an amount of 1.0 part by weight coating per 100 parts by weight core.

Subsequently, two-component developers are prepared by blending together 100 parts by weight of the carrier and 3 parts by weight of the desired toner, introducing the toner and carrier into a Lodige high intensity blender and blending them together at 200 revolutions per minute for 20 minutes.

The developers thus prepared are incorporated into a xerographic imaging apparatus and employed to develop electrostatic latent images. The developed images are Raman-detectible as described in Example I.

EXAMPLE VI

A Raman-detectable ink suitable for use in ink jet printers is prepared by first mixing 15.0 grams of Daxad 19K (W. R. Grace, Deer Park, Tex.) with 300 grams of distilled water. With stirring, this admixing step takes about 10 to 15 minutes. Thereafter, 60 grams of a Raman-detectable material (bis(4-dimethylamino-2-hydroxy-6-methylphenyl) squaraine, prepared as described in U.S. Pat. No. 4,552,822) are added slowly to the Daxad solution with stirring. The resulting dispersion is stirred overnight to disperse the Raman-detectable material uniformly throughout the solution. Subsequently, 31 grams of this dispersion is added to 25 grams of ethylene glycol (Aldrich Chemical Co., Milwaukee, Wis.). To the resulting mixture is then added 0.4 grams of Duponol ME Dry Surfactant (E. I. DuPont de Nemours & Co., Wilmington, Del.), 0.05 grams of Dowicil 200 Preservative (Dow Chemical Co., Midland, Mich.), and 43 grams of distilled water, all with stirring. The pH of the dispersion is then adjusted to about 7 by the addition of 0.5 Molar KOH. The ink thus formed is incorporated into a Hewlett-Packard DeskJet® 500 thermal ink jet printer and Raman-detectable images are generated on paper.

The ink thus formed is also incorporated into a continuous-stream ink jet printer as disclosed in U.S. Pat. No. 4,347,521, the disclosure of which is totally incorporated herein by reference, which printer is subsequently modified as disclosed in U.S. Pat. No. 4,395,716, the disclosure of which is totally incorporated herein by reference, and Raman-detectable images are generated on paper.

The ink thus formed is also incorporated into a drop-on-demand printer DEA as disclosed in S-G. Larsson and G. Lundquist, Research Report No. 10, 1973, Chalmers University of Technology, Gothenburg, Sweden, the disclosure of which is totally incorporated herein by reference, and Raman-detectable images are generated on paper.

An additional ink suitable for ink jet printing is generated as described above with the exception that 11 grams of Basacid Black X34 (BASF) dye is added to the dispersion before the pH is adjusted to 7 with KOH, and the resulting ink is black in color.

EXAMPLE VII

A UV-curable, Raman-detectable liquid developer suitable for polarizable liquid development processes is prepared by first mixing 10 to 30 grams of a Raman-detectable material (bis(4-dimethylamino-2-hydroxy-6-methylphenyl) squaraine, prepared as described in U.S. Pat. No. 4,552,822) with 90 grams of decyl vinyl ether (Decave, International Flavors and Fragrances, New York, N.Y.). In addition, a 30 percent by weight solution of styrene-butylmethacrylate (equal molar monomers) copolymer with a molecular weight of about 50,000 in butanediol divinylether (Rapi-Cure BDVE, GAF, Linden N.J.) is prepared. Thereafter, equal parts by weight of these two preparations are admixed. A UV initiator, di(isobutylphenyl)iodinium hexafluoroarsenate, is prepared as described by Crivello and Lam, Macromolecules, 10(6) 1307, 1977. Subsequently, 90.92 parts by weight of the polymer dispersion, 4.45 parts by weight of devyl vinyl ether (Decave), 4.54 parts by weight of butanediol divinylether (Rapi-Cure BDVE), and 0.20 parts by weight of the iodinium initiator are admixed to form a developer. This developer is incorporated into an imaging test fixture employing the polarizable liquid development process to generate a colorless, Raman-detectable image from an electrostatic image. The image thus formed is cured to a solid by passing the image through a Hanovia UV-6 cure station, Hanovia, Newark, N.J., with the UV lamp set to 300 watts and the conveyor traveling at 20 feet per minute.

EXAMPLE VIII

In a Union Process 1-S Attritor (Union Process Co., Akron, Ohio) is placed 200 grams of a copolymer of ethylene and methacrylic acid (89:11 molar ratio) with a melt index at 190° C. of 100 and an Acid Number of 66, and 1000 grams of Isopar© L (Exxon Corp.). The attritor contents are heated to 100° C., and milled at a rotor speed of 230 rpm with 4.76 mm diameter stainless steel balls for two hours. The attritor is then cooled to room temperature while the milling is continued. Subsequently, 700 grams of Isopar® H is added to the attritor contents and milling is continued at a rotor speed of 330 rpm for 3 hours. The resulting particulate polymer dispersion is then drained to a holding tank. Thereafter, 22 grams of a Raman-detectable material (bis(4-dimethylamino-2-hydroxy-6-methylphenyl) squaraine prepared as described in U.S. Pat. No. 4,552,822) and 92 grams of Basic Barium Petronate (Witco Chemical, New York, N.Y.) are added to the dispersion with stirring. Sufficient Isopar® H is also added to the dispersion to result in a 2 percent by weight solids dispersion, and the dispersion is stirred for 3 hours. The colorless, Raman-detectable electrophoretic developer thus formed is incorporated into a Savin 870 copier and Raman-detectable images are generated on paper.

An additional electrophoretic developer is prepared by the above process with the exception that 15 grams of Heucophthal Blue G XBT-583D (Heubach, Inc., Newark, N.J.) pigment is added to the Union Process 1-S Attritor along with the copolymer to be milled at 100° C., and the resulting developer is cyan in color.

EXAMPLE IX

The process of Example VIII is repeated except that 50 grams of the Raman-detectable material bis(4-dimethylamino-2-hydroxy-6-methylphenyl)squaraine are used instead of 22 grams. Similar results are observed.

EXAMPLE X

A Raman-detectable material (bis(4-dimethylamino-3-methoxyphenyl)squaraine) was prepared as follows. A 250 milliliter three-necked, round-bottomed flask equipped with a Dean-Stark trap and reflux condenser was charged with n-butanol (75 milliliters), toluene (75 milliliters), and squaric acid (2.0 grams). After heating to 90° C., 3-methoxy-N,N-dimethyl aniline was added in one portion. Addition of the amine gave an immediate green color. The reaction mixture was heated to reflux and heated for 3 hours to maintain vigorous reflux.

After cooling to room temperature, bis(4-dimethylamino-3-methoxyphenyl)squaraine was isolated by filtration in 13.5 percent yield as green crystals with a yellow metallic lustre. The absorption spectrum in dichloromethane was 638 nanometers.

Other embodiments and modifications of the present invention may occur to those skilled in the art subsequent to a review of the information presented herein, these embodiments and modifications, as well as equivalents thereof, are also included within the scope of this invention.

What is claimed is:

1. A process which comprises (a) applying to a recording sheet a marking material comprising a Raman-detectable component, wherein said Raman-detectable component, when irradiated with monochromatic radiation, exhibits a detectable Raman spectrum, thereby forming a mark on the recording sheet; (b) irradiating the mark on the recording sheet with monochromatic radiation; and (c) measuring the Raman spectrum of radiation scattered from the mark when the mark is irradiated with monochromatic radiation, wherein the Raman-detectable component is of the general formula

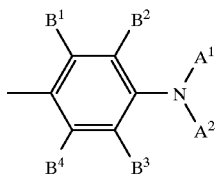

wherein R and R' each, independently of the other, are

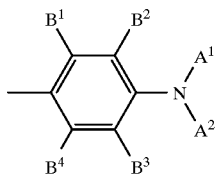

wherein $A_1$ and $A_2$ are each, independently of the other, hydrogen atoms, alkyl groups, aryl groups, arylalkyl groups, heterocyclic rings, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, thiocarbonyl groups, sulfate groups, sulfonate groups, sulfide groups, sulfoxide groups, phosphine groups, phosphonium groups, phosphate groups, nitrile groups, nitroso groups, nitro groups, sulfone groups, acyl groups, acid anhydride groups, or azide groups, and wherein $A_1$ and $A_2$ can be joined together to form a ring containing the nitrogen atom to which $A_1$ and $A_2$ are attached, and wherein $B_1$, $B_2$, $B_3$, and $B_4$ are each, independently of the other, hydrogen atoms, alkyl groups, aryl groups, arylalkyl groups, heterocyclic rings, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, thiocarbonyl groups, sulfate groups, sulfonate groups, sulfide groups, sulfoxide groups, phosphine groups, phosphonium groups, phosphate groups, nitrile groups, nitroso groups, nitro groups, sulfone groups, acyl groups, acid anhydride groups, or azide groups, wherein the B groups can be joined together to form one or more rings,

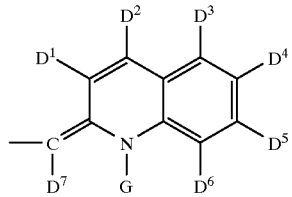

wherein G is selected from the group consisting of hydrogen atoms, alkyl groups, aryl groups, arylalkyl groups, heterocyclic rings, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, thiocarbonyl groups, sulfate groups, sulfonate groups, sulfide groups, sulfoxide groups, phosphine groups, phosphonium groups, phosphate groups, nitrile groups, nitroso groups, nitro groups, sulfone groups, acyl groups, acid anhydride groups, and azide groups, and $D_1$, $D_2$, $D_3$, $D_4$, $D_5$, $D_6$, and $D_7$ each, independently of the others, are hydrogen atoms, alkyl groups, aryl groups, arylalkyl groups, heterocyclic rings, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, thiocarbonyl groups, sulfate groups, sulfonate groups, sulfide groups, sulfoxide groups, phosphine groups, phosphonium groups, phosphate groups, nitrile groups, nitroso groups, nitro groups, sulfone groups, acyl groups, acid anhydride groups, or azide groups, and wherein two or more of the G and D groups can be joined together to form one or more rings, or

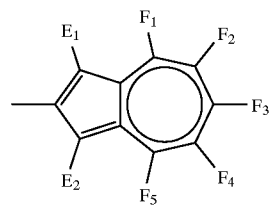

wherein $E_1$ and $E_2$ each, independently of the other, are hydrogen atoms, alkyl groups, aryl groups, arylalkyl groups, heterocyclic rings, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, thiocarbonyl groups, sulfate groups, sulfonate groups, sulfide groups, sulfoxide groups, phosphine groups, phosphonium groups, phosphate groups, nitrile groups, nitroso groups, nitro groups, sulfone groups, acyl groups, acid anhydride groups, or azide groups, and $F_1$, $F_2$, $F_3$, $F_4$, and $F_5$ each, independently of the others, are hydrogen atoms, alkyl groups, aryl groups, arylalkyl groups, heterocyclic rings, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, thiocarbonyl groups, sulfate groups, sulfonate groups, sulfide groups, sulfoxide groups, phosphine groups, phosphonium groups, phosphate groups, nitrile groups, nitroso groups, nitro groups, sulfone groups, acyl groups, acid anhydride groups, or azide groups, wherein two or more of the E and F groups can be joined together to form one or more rings.

2. A process according to claim 1 wherein the Raman-detectable component is present in the marking material in an amount of from about 5 to about 100 percent by weight.

3. A process according to claim 1 wherein the Raman-detectable component is present in the marking material in an amount of from about 80 to about 100 percent by weight.

4. A process according to claim 1 wherein the Raman-detectable component emits a signal in the Raman spectrum when irradiated with light having a wavelength of from about 680 to about 1400 nanometers.

5. A process according to claim 1 wherein the mark on the recording sheet is irradiated with monochromatic radiation from a neodymium YAG laser.

6. A process according to claim 1 wherein the marking material is applied to the recording sheet by a process which comprises forming an electrostatic latent image on an imaging member, developing the electrostatic latent image with a developer comprising the marking material, and transferring the developed image to the recording sheet.

7. A process according to claim 6 wherein the developer comprising the marking material as a dry toner.

8. A process according to claim 6 wherein the developer is a liquid developer.

9. A process according to claim 1 wherein the marking material is applied to the recording sheet by a process which comprises forming an electrostatic latent image on the recording sheet and developing the electrostatic latent image with a developer comprising the marking material.

10. A process according to claim 6 wherein the marking material is an ink and wherein the ink is applied to the recording sheet by a process which comprises incorporating the ink into an ink jet printing apparatus and causing droplets of the ink to be ejected from nozzles of the apparatus onto the recording sheet in an imagewise pattern.

11. A process according to claim 10 wherein the ink in the nozzles is selectively heated in an imagewise pattern, thereby causing droplets of the ink to be ejected in imagewise pattern.

12. A process according to claim 1 wherein the recording sheet is paper.

13. A process according to claim 1 wherein the recording sheet is transparent.

14. A process according to claim 1 wherein alphanumeric images are generated on the recording sheet.

15. A process according to claim 14 wherein the alphanumeric images are generated with the marking material comprising a Raman-detectable component.

16. A process according to claim 14 wherein the alphanumeric images are generated by applying on the recording material that comprises the Raman-detectable mark a second marking material that is substantially free of the Raman-detectable component contained in the marking material comprising said Raman-detectable component.

17. A process which comprises (a) applying to a recording sheet a marking material comprising a Raman-detectable component selected from the group consisting of: (a) squaraine compounds of the formula

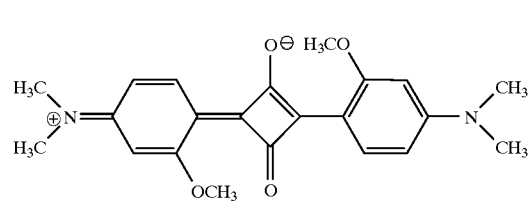

and (b) squaraine compounds of the formula

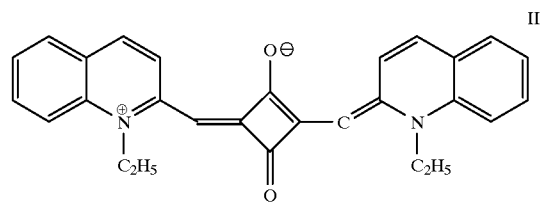

wherein said Raman-detectable component, when irradiated with monochromatic radiation, exhibits a detectable Raman spectrum, thereby forming a mark on the recording sheet; (b) irradiating the mark on the recording sheet with monochromatic radiation; and (c) measuring the Raman spectrum of radiation scattered from the mark when the mark is irradiated with monochromatic radiation.

18. A process according to claim 17 wherein the Raman-detectable component is of the formula I.

19. A process according to claim 17 wherein the Raman-detectable component is of the formula II.

20. A process which comprises (a) applying to a recording sheet a marking material comprising a Raman-detectable component of the general formula

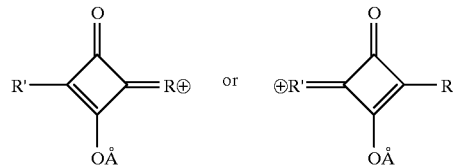

wherein R and R' each, independently of the other, are

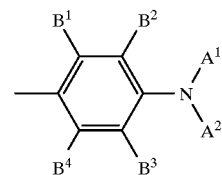

wherein $A_1$ and $A_2$ are each, independently of the other, hydrogen atoms, alkyl groups, aryl groups, arylalkyl groups, heterocyclic rings, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, thiocarbonyl groups, sulfate groups, sulfonate groups, sulfide groups, sulfoxide groups, phosphine groups, phosphonium groups, phosphate groups, nitrile groups, nitroso groups, nitro groups, sulfone groups, acyl groups, acid anhydride groups, or azide groups, and wherein $A_1$ and $A_2$ can be joined together to form a ring containing the nitrogen atom to which $A_1$ and $A_2$ are attached, and wherein $B_1$, $B_2$, $B_3$, and $B_4$ are each, independently of the other, hydrogen atoms, alkyl groups, aryl groups, arylalkyl groups, heterocyclic rings, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, thiocarbonyl groups, sulfate groups, sulfonate groups, sulfide groups, sulfoxide groups, phosphine groups, phosphonium groups, phosphate groups, nitrile groups, nitroso groups, nitro groups, sulfone groups, acyl groups, acid anhydride groups, or azide groups, wherein the B groups can be joined together to form one or more rings, or

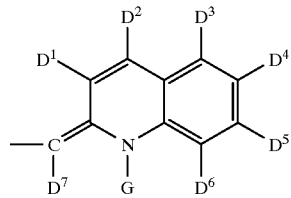

wherein G is selected from the group consisting of hydrogen atoms, alkyl groups, aryl groups, arylalkyl groups, heterocyclic rings, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, thiocarbonyl groups, sulfate groups, sulfonate groups, sulfide groups, sulfoxide groups, phosphine groups, phosphonium groups, phosphate groups, nitrile groups, nitroso groups, nitro groups, sulfone groups, acyl groups, acid anhydride groups, and azide groups, and $D_1$, $D_2$, $D_3$, $D_4$, $D_5$, $D_6$, and $D_7$ each, independently of the others, are hydrogen atoms, alkyl groups, aryl groups, arylalkyl groups, heterocyclic rings, halogen atoms, cyano groups, mercapto groups, hydroxy groups, amine groups, imine groups, ammonium groups, pyridine groups, pyridinium groups, ether groups, aldehyde groups, ketone groups, ester groups, amide groups, carboxylic acid groups, thiocarbonyl groups, sulfate groups, sulfonate groups, sulfide groups, sulfoxide groups, phosphine groups, phosphonium groups, phosphate groups, nitrile groups, nitroso groups, nitro groups, sulfone groups, acyl groups, acid anhydride groups, or azide groups, and wherein two or more of the G and D groups can be joined together to form one or more rings, wherein said Raman-detectable component, when irradiated with monochromatic radiation, exhibits a detectable Raman spectrum, thereby forming a mark on the recording sheet; (b) irradiating the mark on the recording sheet with monochromatic radiation; and (c) measuring the Raman spectrum of radiation scattered from the mark when the mark is irradiated with monochromatic radiation.

21. A process which comprises (a) applying to a recording sheet an ink comprising a Raman-detectable component of the formula

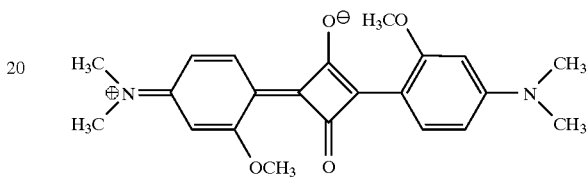

wherein said Raman-detectable component, when irradiated with monochromatic radiation from a Nd:YAG laser, exhibits a detectable Raman spectrum, thereby forming a mark on the recording sheet, wherein the ink is applied to the recording sheet by a process which comprises incorporating the ink into an ink jet printing apparatus and causing droplets of the ink to be ejected from the apparatus onto the recording sheet in an imagewise pattern; (b) irradiating the mark on the recording sheet with monochromatic radiation from a Nd:YAG laser; and (c) measuring the Raman spectrum in a Raman spectrometer of radiation scattered from the mark when the mark is irradiated with monochromatic radiation from a Nd:YAG laser.

\* \* \* \* \*